United States Patent [19]

Schelhaas et al.

[11] 4,075,143

[45] Feb. 21, 1978

[54] RAPID-DRYING PRINTING INK AND A PRINTING PROCESS USING SAME

[75] Inventors: Ealbertus Willem Schelhaas, Heiloo, Netherlands; Eduard Johannes Cornelis Marie Blokker, Orry-la-Ville, France

[73] Assignee: O & R Inktchemie N.V., Zaandam, Netherlands

[21] Appl. No.: 678,971

[22] Filed: Apr. 21, 1976

[30] Foreign Application Priority Data

Apr. 23, 1975 Netherlands ......................... 7504805
Jan. 28, 1976 Netherlands ......................... 7600874

[51] Int. Cl.² .......................... C08L 3/06; C08L 3/10; C08L 93/04; C09D 11/08
[52] U.S. Cl. ..................................... 260/17.2; 106/30; 260/17.4 ST; 260/25; 260/27 R; 260/29.3; 260/33.6 UA; 260/842; 260/843
[58] Field of Search ............... 260/842, 843, 25, 27 R, 260/17.4 ST, 29.3, 17.2; 106/30

[56] References Cited

U.S. PATENT DOCUMENTS

| | | | |
|---|---|---|---|
| 2,434,168 | 1/1948 | Krumbhaar | 260/104 |
| 2,613,198 | 10/1952 | Honel et al. | 260/843 |
| 2,626,249 | 1/1953 | Honel et al. | 260/843 |
| 2,652,382 | 9/1953 | Davis | 260/842 |
| 2,652,383 | 9/1953 | Davis | 260/842 |
| 3,182,041 | 5/1965 | Watkins et al. | 260/843 |
| 3,527,722 | 9/1970 | Carlson et al. | 260/835 |
| 3,730,865 | 1/1973 | Kopalko et al. | 260/831 |
| 3,881,942 | 5/1975 | Buckwalter | 260/42.21 |

OTHER PUBLICATIONS

Whitehouse et al. - Phenolic Resins (Amer. Elsevier Pub. Co.) (1967), pp. 66, 70 & 71.

*Primary Examiner*—Donald E. Czaja
*Assistant Examiner*—H. H. Fletcher
*Attorney, Agent, or Firm*—Amster & Rothstein

[57] ABSTRACT

A printing ink which rapidly dries under the influence of heat, in particular from infra-red radiation, and which is composed of:
  a non-polar solvent,
  a modified phenol- or cresol formaldehyde resin,
  a crosslinkable unsaturated polyester,
  a peroxide catalyst for said polyester, and
  a pigment.

20 Claims, No Drawings

RAPID-DRYING PRINTING INK AND A PRINTING PROCESS USING SAME

In modern printing techniques a rapid drying of the applied ink is of extreme importance, because otherwise the still wet ink is transferred to the reverse side of the following printed sheet and moreover the further processing, including printing the reverse side of the material, is considerably delayed.

In order to avoid the above problems resulting from the still wet condition of the applied printing ink, in the sheet-fed offset process and in the relief printing process the still wet ink layer is sprayed with a powder on the basis of starch, as a result of which a protective layer is formed. However, this technique has several drawbacks, such as pollution of the working-space and the printing machines, as a result of which extra maintenance has to be carried out, and the obtention of a qualitatively inferior final product.

In the rotary offset process there is not worked with powder, but several so-called cold and hot processes are applied to accelerate the drying of the ink layer. These processes do not lead to the desired effect, at least not to a sufficient extent, or have the drawbacks that the printed paper is deformed, the energy consumption is high, and great quantities of solvent of the printing ink find their way into the atmosphere.

Now there has been found a printing ink which very rapidly dries under the influence of heat, in particular from infra-red radiation, so that the above-described drawbacks of the prior art techniques can simply be avoided. The rapid-drying printing ink according to the invention is composed of:
a non-polar solvent,
a modified phenol- or cresol formaldehyde resin,
a crosslinkable unsaturated polyester,
a peroxide catalyst for said polyester, and
a pigment.

In the printing ink the resin and the polyester, together forming the binder, are both present in dissolved state. In fact the polyester keeps the resin in solution, because it sees to it that the threshold concentration of binder is passed, below which the resin is not soluble in the non-polar solvent. By the influence of the heat, in particular from infra-red radiation, on the wet ink layer the peroxide catalyst is activated, as a result of which free radicals are produced which initiate a rapid crosslinking of the unsaturated polyester. The crosslinked polyester is not soluble in the non-polar solvent, so that said threshold concentration is no longer reached and the resin expels the non-polar solvent, which is subsequently absorbed by the printed substrate. By means of this particularly rapid process an effective drying of the ink layer is obtained in a simple manner. In practice excellent results are obtained when the weight ratio of the resin and polyester together to the non-polar solvent is greater than 1/1, while the weight ratio of the resin only to the non-polar solvent is smaller than 1/1.

The non-polar solvent used according to the invention usually is a hydrocarbon mixture conventional in printing inks, such as a paraffinic oil having an aliphatic nature obtained by distillation of petroleum, but which may contain minor amounts of aromatics or naphthenes.

As modified phenol- or cresol formaldehyde resin are used the conventional resins of this type, it being preferably modified with colophony and most preferably subsequently further esterified with a polyhyric alcohol, such as glycerol, pentaerytritol, sorbitol and the like. These resins are only compatible with non-polar organic solvents when the total quantity of binder passes a specific minimum concentration (threshold concentration). Below this concentration expulsion takes place.

The crosslinkable unsaturated polyester is preferably composed of three types of components, namely units derived from a polyhydric alcohol, such as glycerol, pentaerytritol, mannitol or sorbitol, units derived from a phthalic acid, preferably isophthalic acid, and units derived from an unsaturated aliphatic acid, most preferably linoleic acid and/or linolenic acid, which latter units mostly constitute the greatest part by weight of the polyester.

The peroxide catalyst may be composed of a conventional organic peroxide or hydroperoxide and a siccative. The peroxide or hydroperoxide is preferably used in an amount of 1-5 wt. %, calculated on the total binder (resin plus polyester). As suitable compounds may be mentioned cumene hydroperoxide and cyclohexanone peroxide.

Siccatives, which are used in combination with the conventional organic peroxide or hydroperoxide, are the likewise conventional siccatives. As such can be used soaps of a trivalent metal, e.g. trivalent vanadium, iron, manganese or cobalt. Cobalt soaps are preferred, such as cobalt naphthenate, cobalt resinate, cobalt stearate or cobalt octoate. The siccative is usually added in an amount of 0.2-2 wt. %, calculated on the total binder.

According to this embodiment the conventional organic peroxide or hydroperoxide may not be added to the rest of the printing ink too long before printing. At a normal temperature of about 20° C the storage time of the mixed ink is about 24 hours. However, taking this into account, it will be possible to obtain a smoothly going printing process and a very rapid drying of the ink layer by the influence of heat, preferably orginating from infra-red radiation. This latter to a very high extent activates the influence of the siccative on the peroxide or hydroperoxide, so that rapidly free radicals are formed which immediately initiate the crosslinking of the unsaturated polyester, which results in a rapid drying of the ink layer as earlier described.

However, the peroxide catalyst preferably is an organic peroxide which is decomposed at a temperature between 70° and 80° C with formation of free radicals initiating the crosslinking of the polyester. The required decomposition temperature is obtained by the influence of heat, preferably originating from infra-red radiation. Below a temperature of 70° C the thermally decomposable organic peroxides are particularly stable, so that the ink ready for printing can be stored for a long time, namely for about six months at a temperature of about 20° C. This is an important advantage, since this renders it possible to prepare a ready ink, to market same and to keep same in stock. Suitable thermally decomposable organic peroxides are inter alia isobutyl peroxide, dibenzoyl peroxide and tert. butylperoxy-2-ethyl hexoate, which all decompose at a temperature of 70° C. These organic peroxides are mostly added in an amount of 1-6 wt. %, calculated on the total binder. An ink prepared with these thermally decomposable peroxides has excellent properties on the printing press; it causes practically no deposition of solid material on the rollers and ensures a rapid an effective drying of the applied ink layer upon heating, most preferably by means of infra-red radiation.

When a thermally decomposable peroxide is used no siccative need be used, which is the case, though, when there are used the earlier described conventional organic peroxides or hydroperoxides. However, the drying can yet be extra accelerated by furthermore adding to the printing ink an activator for the thermally decomposable peroxide. This may be useful when a thick ink film is printed. Particularly effective activators are tertiary amines, e.g. dimethyl-p-toluidine, which may be added in a very small amount, namely an amount of 0.05–0.4%. As a result of the presence of these activators the storage life of the ready printing ink is reduced somewhat.

The present printing ink can be prepared according to techniques conventional to one skilled in the art. Usually, the resin and the polyester are first dissolved in the non-polar solvent under heating. After cooling, the other components, namely a pigment, siccative, if any, thermally decomposable organic peroxide, activator and other additives used in some cases, such as fillers, are added to the obtained solution, and the mixture is milled in a conventional apparatus, such as a three-roller mill or a ball mill, to form a homogeneous printing ink. This can be brought into cans and as such be supplied to printing works. Only when a conventional organic peroxide or hydroperoxide is used together with a siccative, this peroxide has to be added yet afterwards, as was already elaborately described above.

A particular interesting additive for the present printing ink are fine granules of a modified starch or a starch derivative having a limited swelling power under the influence of water, or of an other natural or synthetic substance having similar properties. Such granules make yet an extra contribution towards the prevention of damage and transfer of the freshly printed ink layer, in particular when a printed sheet "lands" on the previously printed sheet in a sheet-feed printing process.

Before and/or during printing said fine granules take up a little water, which is always present somewhere in their surroundings and which need therefore not be specially supplied. For example, the water may originate from the printing ink itself, from the ambient air, from the printing plate and/or from the material to be printed. As a result of the absorption of water, which is even accelerated by the infra-red radiation, the fine granules swell somewhat but their swelling power is limited owing to the use of a suitably modified starch or a suitable starch derivative, so that only a slight increase of the granular size occurs an in fact globules are produced which slight project above the printed ink layer and constitute bearing faces on which the following printed sheet "lands". Thus it is prevented that during said "landing" the still fresh ink layer of the previous sheet is damaged and is partly transferred to the reverse side of the "landing" sheet. The swelling of the granules may by no means be such that they burst open and pass into a sort of colloidal state, because then the contemplated effect can no longer be obtained.

The globules formed have the additional advantage that the freshly printed ink layer feels less sticky and that the printed sheets in a stack less easily stick together.

Preferably, the fine granules for use in the printing ink according to the invention in dry state have an average size of about $10\mu$. The desired granular size can be obtained by screening the starch powder concerned.

Particularly suitable starches for use according to the invention are tapioca, wheat starch and in particular corn starch.

The swelling powder of the fine granules used has to be limited, as was described above. In the printing ink the granules may occur in a somewhat swollen condition, but the swelling may not be too much, so that the average size of the swollen granules or globules does not exceed a value of about $20\mu$. For larger granules or globules cause troubles, such as sagging and sticking together, during the printing process. In order to attain the required limited swelling power of the granules, the starch is suitably modified or converted to a suitable starch derivative.

The modification can be carried out by treating the starch in a known manner with a preferably concentrated acid or with enzymes in order to effect a limited hydrolytic degradation, as a result of which there can, for example, be obtained a modified starch having a fluidity (determined by an American testing method) of 50–60, which is particularly suitable for the object of invention. An other known method to so modify starch that there is obtained a product suitable for the invention consists in a controlled oxidizing treatment with oxidizing substances, such as hypochlorite, hydrogen peroxide or a periodate. Particularly suitable is an oxidizing treatment with 3% active chlorine, originating from an alkali metal hypochlorite, in a neutral or weakly alkaline medium.

Suitable starch derivatives for use according to the invention are esterification and etherification products of starch, for example of native starch having a high swelling degree, as a result of which a certain swelling-inhibitory effect is obtained. As starch esters may be mentioned acetyl starch and haloacetyl starch products. As starch ethers are eligible hydroxyethyl starch, hydroxypropyl starch, carboxymethyl starch and cyanoalkyl starch products.

The fine granules of a modified starch or a starch derivative are usually added to the printing ink in an amount of 0.1–2.0 wt.%, preferably 0.2–1.2 wt. %, calculated on the total ink. The optimum quantity to be used in a specific case of course depends on a number of factors, in particular the nature of the starch product used, the rest of the composition of the printing ink, as well as the manner of printing and the nature of the material to be printed, and can easily be determined by way of experiment.

According to a particularly suitable method to process the fine granules into the printing ink there is prepared beforehand a paste of said granules, and this paste is then mixed uniformly with the ink. Such a paste usually contains 15–40 wt. % fine granules of the modified starch or of the starch derivative and for the rest may be composed of a carrier liquid, for example water or an organic liquid such as hydrocarbon mixture, a binder, for example a known varnish for printing ink, and possibly aids such as waxes, surfactants etc. In this paste the fine granules may already be slightly swollen, so that the granular size lies between 10 and $15\mu$.

The present printing ink may also be a so-called emulsion ink, in which a water phase has been emulsified in the organic phase. The water phase then constitutes preferably not more than about 20 wt. % of the total ink and may contain all sorts of useful additives, such as buffering agents, waxes, e.g. polyethylene wax, oxidizing agents, accelerators and gums or other binding agents, for example in latex form. When fine granules of a modified starch or of a starch derivative are used in the printing ink, as was elaborately described above, then the water phase promotes the swelling of said granules and therefore the contemplated effect. On account of the vigorous heat treatment of the freshly printed ink layer the use of an emulsion ink in the present case does not lead to degradation of the printing properties, in particular loss of gloss and strength of the printed layer.

The printing ink according to the invention can be successfully employed in various printing processes. However, it is extremely suitable for relief printing (letterpress printing) or planographic printing, such as sheet-fed offset or rotary offset, it being possible to carry out both single-colour and multicolour printing, for example four-colour printing. Any conventional material, such as paper, cardboard or synthetic material, can be printed, it being important, however, that the printed surface is at least somewhat porous, so that it is capable to at least partly absorb the expelled non-polar solvent. When a totally imporous material, such as tin, is printed, it will only be possible to obtain a rapid drying if the present printing technique (ink plus infra-red radiation) is combined with known techniques of accelerated drying.

For carrying out the heat treatment, which in practice is an infrared irradiation, infra-red lamps or elements are so arranged that they irradiate the still wet ink layer of the freshly printed material.

For several reasons there are preferably used infrared lamps which substantially, for example for more than 75%, radiate in the near infra-red, i.e. in the spectral range between 0.75 and 3 microns. Such lamps have the advantage that the supplied heat is substantially absorbed by the printed areas which have the highest optical density, while the non-printed, mostly white, areas for the greater part reflect the heat rays, so that the risk of excess heating and deformation of the printed material is avoided. Moreover, with this type of lamps the heating and cooling time are very short (only a few seconds), so that, when the printing machine is stopped, the paper remaining in front of the lamps cannot catch fire. Suitable infra-red lamps emitting in the near infrared are the IRK-lamps having a power of 1000 or 2000 W of Philips N.V., Eindhoven (Netherlands).

A very rapid drying of the ink is also attained by means of infra-red lamps particularly emitting in the deep infra-red, i.e. in the spectral range between 3 and 10 microns. Elstein elements of 1000 W are an example of such lamps. However, they have the drawback that easily deformation of the printed paper occurs, because also the non-printed areas absorb great quantities of heat, and that the heating time (about 15 minutes) and the cooling time (about 10 minutes) are very long. The long afterglow can even set the stationary paper on fire.

The infra-red lamps are mostly arranged in a blowing-air cooled battery which extends over the total width of the printing machine. The power of the infra-red lamps together varies of course as a function of several factors, such as the width of the printing machine, the distance to the printed material, the nature thereof, the composition of the printing ink etc. For the purpose of orientation it may be stated that, for example, in a four-colour rotary offset press having a paper web width of 1 m excellent drying results are obtained when the total power of the infra-red lamps lies between 25 and 35 kW. The time of irradiation is at most some tenths of a second.

In addition to the advantages already discussed above the invention offers yet a number of other advantages over the prior art printing ink and printing techniques. For example, the printed ink layer has a higher colour density, as a result of which a considerable saving of ink can be obtained. Furthermore there is observed an improvement of the print definition, and the dry ink layer has a considerably higher gloss as well as a much higher resistance to abrasion, so that the application of a final glossy protective layer can be omitted. Finally, the vapours liberated during drying can easily and efficiently be removed via a central discharge system, so that nuisance caused by stench is avoided. Also the still warm stack of freshly printed material can be connected to the discharge system, for example, via a plastic cover and a tube.

The invention will now be further explained by means of the following examples.

EXAMPLE I

At 200° C there was prepared a solution (varnish) having the following composition:

| | |
|---|---|
| Krumbhaar Resin K 1400* (Lawter Chemicals, Chicago, U.S.A.) | 40 parts by weight |
| Trionol 7** (Lawter Chemicals) | 15 parts by weight |
| paraffin oil (petroleum distillate being 100% aliphatic in nature and having a boiling range of 260-290° C) | 45 parts by weight |

*a phenol formaldehyde resin modified with colophony and subsequently esterified with pentaerytritol (acid number <20; melding point Ring and Ball 160° C; compatible with mineral oils having a Kb-value of about 27 in an amount of at least 1/1);
**a crosslinkable unsaturated polyester substantially consisting of linoleic acid (74%) and for the rest of isophthalic acid and pentaerytritol (acid number maximally 10; viscosity 20° C 700 Poise; in all ratios compatible with mineral oils having a Kb-value of about 27).

There was prepared a red ink for four-colour sheet-fed offset printing having the following composition:

| | |
|---|---|
| varnish (prepared as described above) | 80.0 parts by weight |
| pigment red 57 (CI 15,850) | 17.8 parts by weight |
| cobalt octoate (10% cobalt) | 0.4 parts by weight |

The resulting mixture was milled in a three-roller mill to form a homogeneous dispersion, after which the ink could be brought into cans. A short time before printing 1.8 parts of cyclohexanone peroxide were added yet.

After printing with the thus prepared ink there was obtained a highly effective and rapid drying of the ink layer of irradiating same for 0.1–0.2 seconds with IRK-lamps of 1000 W (about 85% of the radiation lies in the range of 0.75–3 microns).

EXAMPLE II

There was prepared a red ink for relief or letterpress printing having the following composition:

| | |
|---|---|
| varnish (prepared as described in Example I) | 76 parts by weight |
| aluminum hydroxide | 4.8 parts by weight |
| pigment red 57 | 17.0 parts by weight |
| cobalt octotate (10% cobalt) | 0.4 parts by weight |

The resulting mixture was milled and further treated as indicated in Example I. Shortly before printing 1.8 parts by weight of cyclohexanone peroxide were added yet.

After printing followed by infra-red irradiation as in Example I there was obtained an excellent and rapid drying.

EXAMPLE III

A red ink for rotary offset printing was prepared by milling a mixture consisting of 60.8 parts by weight of varnish, as described in Example I, and 12.0 parts by weight of pigment red 57 in a threeroller mill, and adding to the thus obtained homogeneous dispersion yet 26.0 parts by weight of paraffin oil (see Example I) and 0.2 parts by weight of cobalt octoate. The printing ink could subsequently be brought into cans. Shortly before use there was added yet 1.0 part by weight of cyclohexanone peroxide.

After printing followed by infra-red irradiation as in Example I there was obtained an excellent and rapid drying.

Example IV

A red ink for four-colour sheet-fed offset printing was prepared by mixing 17.8 parts by weight of pigment red 57 with 80.4 parts by weight of varnish, as described in Example I, milling said mixture in a three-roller mill, adding at a temperature below 40° C 1.8 parts by weight of dibenzoyl peroxide, and properly mixing same.

The thus prepared ink was ready for use and could easily be stored for 3-4 months at room temperature without a decrease of the good drying properties.

After printing and drying as in Example I the same favourable drying result was obtained.

EXAMPLE V

A red ink for relief or letterpress printing was prepared by mixing 4.3 parts by weight of aluminum hydroxide and 17.0 parts by weight of pigment red 57 with 77.0 parts by weight of varnish, as described in Example I, milling the mixture in a three-roller mill, adding at a temperature below 40° C 1.7 parts by weight of isobutyl peroxide, and properly mixing same.

The thus prepared ink was ready for use and could be stored for a long time.

After printing and drying as in Example II the same favourable drying result was obtained.

EXAMPLE VI

A red ink for rotary offset printing was prepared by mixing 12.0 parts by weight of pigment red 57 with 61.0 parts by weight of varnish, as described in Example I, milling the mixture in a three-roller mill, adding 26.0 parts by weight of paraffin oil (see Example I), once again properly mixing same, and finally adding at a temperature below 40° C 1.0 part by weight of isobutyl peroxide.

The thus prepared ink was ready for use and could be stored for a long time.

After printing and drying as in Example III the same favourable drying result was obtained.

EXAMPLE VII

A paste was prepared by intimately mixing together the following components:

| | |
|---|---|
| varnish (prepared as described in Example I) | 1400 parts by weight |
| modified starch*** | 700 parts by weight |
| polyethylene wax | 100 parts by weight |
| water | 250 parts by weight |
| tridecyl alcohol | 50 parts by weight |

***Corn starch having a granular size of about 10 μ, which at 20° C under stirring is treated with concentrated hydrochloric acid until a fluidity of about 55 is reached, after which the hydrolytic degradation is stopped by addition of sodium carbonate.

From a mixture of the following composition:

| | |
|---|---|
| varnish (prepared as described in Example I) | 79.0 parts by weight |
| pigment red 57 | 17.8 parts by weight |
| paste (prepared as described above) | 1.0 parts by weight |
| cobalt octoate (10% cobalt) | 0.4 parts by weight | was prepared a red ink for four-colour sheet-fed offset printing as described in Example I. Shortly before printing were added yet 1.8 parts by weight of cyclohexanone peroxide.

After printing and drying as in Example I the same favourable drying result was obtained, while during "landing" of the successive printed sheets no transfer of the still fresh ink layer took place.

EXAMPLE VIII

A red ink for relief or letterpress printing was prepared having the following composition:

| | |
|---|---|
| varnish (prepared as described in Example I) | 74 parts by weight |
| aluminum hydroxide | 4.8 parts by weight |
| pigment red 57 | 17.0 parts by weight |
| paste (prepared as described in Example VII) | 2.0 parts by weight |
| cobalt octoate (10% cobalt) | 0.4 parts by weight |

The resulting mixture was milled and further treated as indicated in Example I. Shortly before printing were added yet 1.8 parts by weight of cyclohexanone peroxide.

After printing and drying as in Example II the same favourable drying result was obtained without transfer of the ink layer during "landing" of the printed sheets.

EXAMPLE IX

A red ink for four-colour sheet-fed offset printing was prepared by mixing 17.4 parts by weight of pigment red 57 with 79.4 parts by weight of varnish, as described in Example I, and 1.4 parts by weight of paste as described in Example VII, milling the mixture in a three-roller mill, adding at a temperature below 40° C 1.8 parts by weight of dibenzoyl peroxide, and properly mixing same.

The thus prepared ink was ready for use and could easily be stored for 3-4 months at room temperature without a decrease of the good drying properties.

After printing and drying as in Example I the same favourable drying result was obtained, while practically no transfer of the ink layer took place during "landing".

EXAMPLE X

A red ink for relief or letterpress printing was prepared by mixing 4.3 parts by weight of aluminum hydroxide and 16.6 parts by weight of pigment red 57 with 75.8 parts by weight of varnish, as described in Example I, and 1.6 parts by weight of paste as described in Example VII, milling the mixture in a three-roller mill, adding at a temperature below 40° C 1.7 parts by weight of isobutyl peroxide, and properly mixing same.

The thus prepared ink was ready for use and could be stored for a long time.

After printing and drying as in Example II the same favourable drying result was obtained, while also transfer during "landing" of the printed sheets was prevented.

We claim:

1. A printing ink which rapidly dries under the influence of heat, and which is composed of a non-polar solvent, a binder formed from a phenol- or cresol formaldehyde resin modified with colophony or with colophony and a polyhydric alcohol and a crosslinkable unsaturated polyester, a peroxide catalyst for said polyester present in the amount of 1-6 wt.% of said binder, and a pigment, the weight ratio of the solvent, the resin and the polyester is such that the two latter components are present in dissolved state, but the resin is no longer soluble after the polyester has been crosslinked, and as a result has disappeared from the solution.

2. A printing ink according to claim 1, characterized in that the non-polar solvent is a hydrocarbon mixture conventional in printing inks.

3. A printing ink according to claim 1, characterized in that the modified resin is a phenol formaldehyde resin modified with colophony.

4. A printing ink according to claim 3, characterized in that the colophony-modified phenol formaldehyde resin is further esterified with a polyhydric alcohol.

5. A printing ink according to claim 1, characterized in that the unsaturated polyester is composed of a polyhydric alcohol, a phthalic acid component and an unsaturated aliphatic carboxylic acid.

6. A printing ink according to claim 1, characterized in that the peroxide catalyst is an organic peroxide which is decomposed at a temperature between 70° and 80° C with formation of free radicals.

7. A printing ink according to claim 6, characterized in that the organic peroxide is isobutyl peroxide.

8. A printing ink according to claim 6, characterized in that the organic peroxide is dibenzoyl peroxide.

9. A printing ink according to claim 6, characterized in that the organic peroxide is tert. butylperoxy-2-ethyl hexoate.

10. A printing ink according to claim 1, characterized in that the weight ratio of the resin and polyester together to the solvent is greater than 1/1, while the weight ratio of the resin only to the solvent is smaller than 1/1.

11. A printing ink according to claim 1, characterized in that the ink contains as additive fine granules of a modified starch or a starch derivative having a limited swelling power under the influence of water, said additive being present in an amount of 0.1-2.0 wt.% calculated on the total ink.

12. A printing ink according to claim 11, characterized in that the fine granules have an average granular size of not more than $20\mu$.

13. A printing ink according to claim 11, characterized in that the additive is a starch modified by treatment with an acid or with enzymes.

14. A printing ink according to claim 11, characterized in that the additive is an oxidized starch.

15. A printing ink according to claim 11, characterized in that the additive is a starch ether or a starch ester.

16. A printing ink according to claim 11, characterized in that the additive is a modified corn starch or a corn starch derivative.

17. A printing process for use in planographic printing or relief printing process, in which is employed a printing ink according to claim 1 for printing a material which is capable of absorbing the solvent of the printing ink, and the printed material is exposed to the influence of heat.

18. A printing process for use in a sheet-fed planographic printing or relief printing process, in which is employed a printing ink according to claim 11 for printing a material which is capable of absorbing the solvent of the printing ink, the printing is carried out in the presence of water causing the fine granules to swell, and the printed material is exposed to the influence of heat.

19. A printing process according to claim 17, characterized in that the heat originates from infra-red radiation which substantially lies in the near infra-red.

20. Printed material, obtained by the process according to claim 16.

* * * * *